UNITED STATES PATENT OFFICE.

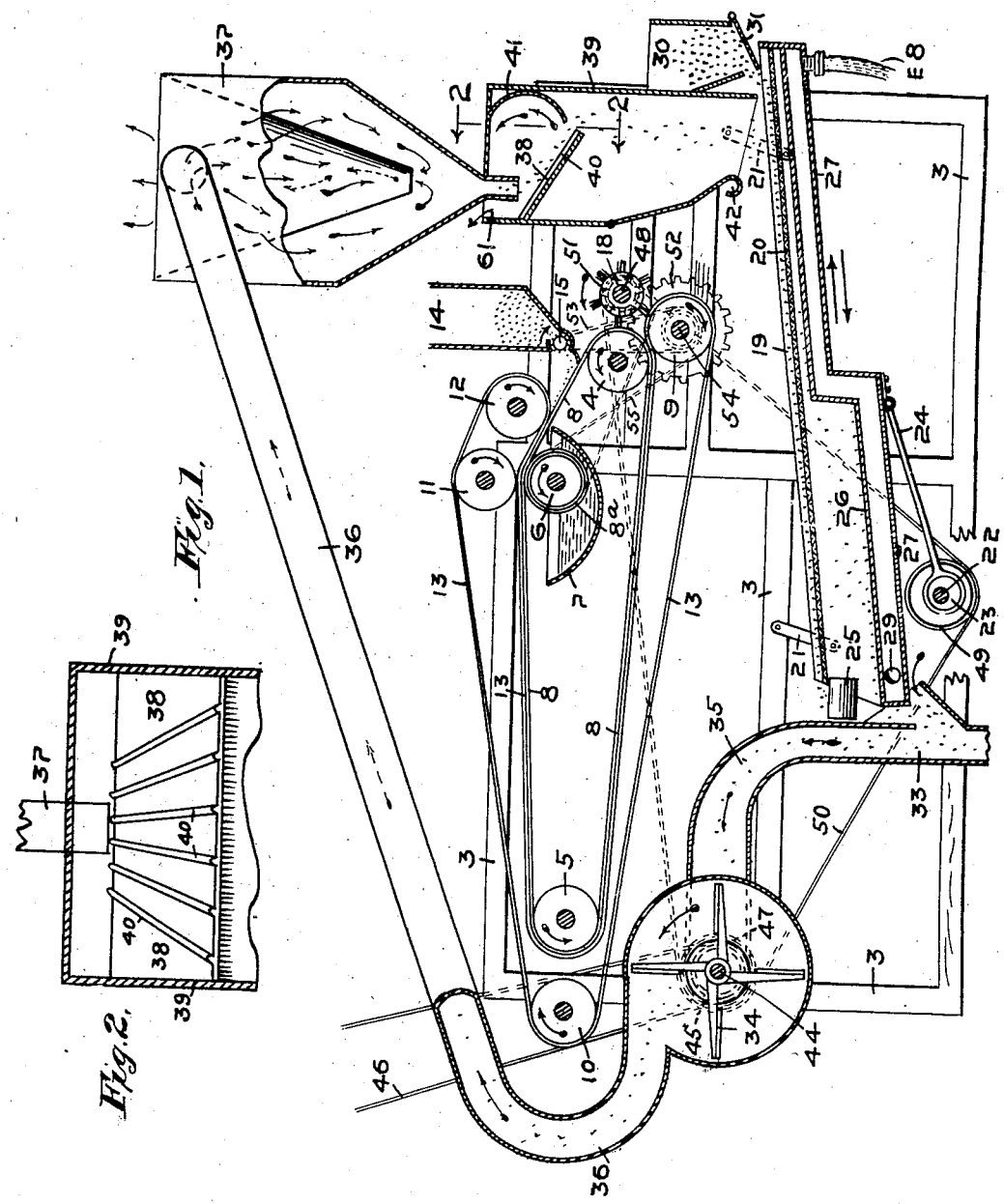

SHIRL HERR, OF LEBANON, INDIANA.

CLOVER-SEED-RECLEANING PROCESS.

No. 813,890.      Specification of Letters Patent.      Patented Feb. 27, 1906.

Application filed April 20, 1905. Serial No. 256,672.

*To all whom it may concern:*

Be it known that I, SHIRL HERR, a citizen of the United States, residing at Lebanon, in the county of Boone and State of Indiana, have invented certain new and useful Improvements in Clover-Seed-Recleaning Processes, of which the following is a specification.

This invention relates to improvements in means for separating clover-seed from the seeds of certain noxious weeds of practically the same size and shape and specific gravity as clover-seed, and therefore difficult to separate, but which differ from clover-seed by having a surface coating which becomes mucilaginous or viscid, and therefore adhesive, when moistened. "Buckhorn-seed," a product of a species of plantain, is the most notable example of this objectionable variety. Efforts have been made to separate buckhorn from clover seed by pressing the mixture to be cleaned against a dampened belt, which causes the buckhorn to adhere to the belt, and then by drying the belt the clover-seed will drop off by gravity or may be removed by slightly jarring or brushing the belt. The above methods require a preliminary drying of the belt, which is difficult of accomplishment where quick operations are required, as they are for commercial success; and the object of my invention is to hasten the process of separating the seeds by dispensing with the belt-drying operation and by providing an inexpensive substance which when moistened will collect the buckhorn-seeds and will be readily separable from the clover-seeds, to be thrown away or otherwise disposed of.

I accomplish the objects of the invention by the mechanism illustrated in the accompanying drawings, in which—

Figure 1 is a longitudinal vertical section of my machine, and Fig. 2 a detail in vertical section on the line 2 2 of Fig. 1.

Like characters of reference indicate like parts throughout the two views.

In the drawings, 3 is an elongated frame, having the drum 4 near one end and at its other end or near thereto the drum 5. Between the drums 4 and 5 above said drums and nearest to the drum 4 is the drum 6, which is partially submerged in the tank of water 7. The drum 6 is covered with felt 8ª or other absorbent material. Upon the three drums 4, 5, and 6 travel an endless belt or apron 8, of stout canvas or other suitable flexible material.

9 is a drum mounted in frame 3 under drum 4 and between the drum 4 and adjacent end of the frame, as shown in the drawings, and 10 is a drum mounted at the other end of the frame beyond drum 5 and parallel with drum 5.

11 is a drum mounted above and adjacent to drum 6, and 12 is a drum adjacent to the drums 11 and 6, below drum 11 and above drum 6, but laterally of and out of contact with both, as shown.

13 is a belt or apron, preferably of the same material as the apron 8. The apron 13 passes from the drum 9 back and around the drum 5, thence to and over drum 6, thence around the drum 12, over drum 11, around the drum 10, and around the drum 9 to the place of beginning, and it is a continuous unbroken belt, which is made to travel in the directions indicated by the arrows on the several drums with which it comes in contact. Between the drums 4 and 5, 5 and 6, and 6 and 12 the belts 8 and 13 are in contact with each other, and both belts move in the same direction over all parts of their travel in contact with each other.

14 is a hopper containing the clover-seed to be recleaned. It has a bottom discharge-opening, in which is located the feed-roller 15, having radial projections to positively feed the seed from the hopper onto belt 8 by the rotation of said feed-roller 15.

The seed fed from hopper 14 upon belt 8 is carried under drum 12 and moves thence between belts or aprons 8 and 13, over drum 6, where it is moistened by water from tank 7, fed to said belts by the roller 6. The wet seed is carried from roller 6 back to and around the roller or drum 5 and thence to the point of separation of the two aprons at drums 4 and 9. Located opposite drums 4 and 9 at the divergence of the two aprons 8 and 13 is the rotary brush 18, which sweeps both aprons and brushes all of the seed thereon contained down toward the bottom of the machine.

Located under brush 18 in the paths of the seeds discharged from the aprons by said brush is a frame 19, having a top wire screen 20, with a mesh just large enough to allow a clover-seed to pass through it freely. The frame 19 is suspended by links 21 from the main frame 3. Supported by the frame 3 and located transversely of the frame 3 under the frame 19 is a shaft 22, having an eccentric 23, around which is an eccentric-ring having a rod 24, which is connected with the frame 19, whereby by the rotation of shaft 22 the frame 19 will be given a vibratory movement. The frame 19 and screen 20 are oblique to the horizontal and slope inwardly to the discharge 25. The carrier-apron leads laterally out of the machine, where it discharges whatever has been deposited thereon. Located under screen 20 is a bottom 26 to receive all that passes through the screen, and located below the bottom 26 and suitably separated therefrom is a second bottom 27. The space between the bottoms 26 and 27 is closed at sides and ends to form a chamber into which steam is admitted through the pipe 28 and from which the steam is exhausted through the opening 29. The purpose of this steam is to heat the bottom 26 and the screen 20 in order to dry out the seeds and other materials deposited thereon.

Located at the end of the machine, which is at the upper end of the frame 19, is the hopper 30, containing sawdust, which is discharged through an opening at the bottom of the hopper upon the screen 20. An adjustable bottom 31 provides a means for regulating the discharge-opening from hopper 30. The sawdust deposited upon screen 20 is gradually worked toward the lower end of the screen by the vibration of frame 19, and in its progress down the screen it passes under the brush 18, and the wet seeds cast down by said brush come in contact with the sawdust and the buckhorn-seeds with their coatings rendered mucilaginous in their wet condition adhere immediately to the sawdust upon contact therewith and become practically inseparable from said sawdust. The clover-seed, on the other hand, not having this mucilaginous coating loses what moisture it may have derived from the belts by absorption from the sawdust and the evaporation due to the heat from the steam under the bottom 26 and falls through the meshes of the screen 20 upon said bottom 26. The sawdust with the adhering buckhorn-seed is too large to pass through the screen 20 and is therefore carried down and deposited upon the carrier-apron 25 and is removed from the machine by the apron, as previously stated. The vibration of the frame 19 causes the clover-seed passing through screen 20 upon bottom 26 to work down to the lower end of the screen, from whence it discharges into the pipe 33, by which it is directed to a suitable storage-bin or from which it is filled into bags for use.

While I have mentioned sawdust as the material to which the buckhorn-seeds will be made to adhere, it is practicable to use bran, oats, and a variety of substances, and I therefore do not desire to limit the invention to the use of sawdust.

Having thus fully described my invention, what I claim as new, and wish to secure by Letters Patent of the United States, is—

1. The process of separating mixed seeds, which consists essentially in moistening the seeds, then bringing the seeds into contact with a comminuted material to which the undesirable seeds adhere but which material will not adhere to the good seeds, and then removing from the mass the undesirable seeds and material to which they adhere.

2. The process of separating mixed seeds, which consists essentially in moistening the seeds, then bringing the seeds into contact with a comminuted material to which the undesirable seeds adhere but which material will not adhere to the good seeds, then removing from the mass the undesirable seeds and material to which they adhere and then removing the remainder of said comminuted material from the good seeds.

In witness whereof I have hereunto set my hand and seal, at Indianapolis, Indiana, this 30th day of March, A. D. 1905.

SHIRL HERR. [L. S.]

Witnesses:
J. A. MINTURN,
F. W. WOERNER.